United States Patent Office 2,763,644
Patented Sept. 18, 1956

2,763,644
PROCESS FOR THE PRODUCTION OF CAPROLACTAM

Lorraine Guy Donaruma, Woodbury, N. J., assignor to E. I. du Pont de Nemours and Company, Wilmington, Del., a corporation of Delaware No Drawing. Application April 15, 1955,
Serial No. 501,735

5 Claims. (Cl. 260—239.3)

The present invention relates to a process for the production of lactams and, more specifically, to a process whereby ε-caprolactam (caprolactam) can be produced from water-soluble salts of nitrocyclohexane in a single reaction.

Lactams are used for the production of polyamides suitable for use as fabrics, films, fibers, coating compositions, and the like. Heretofore, the usual preparation of lactams has been by Beckmann rearrangement of ketoximes. Caprolactam, the most important member of this class, has long been prepared by rearrangement of cyclohexanone oxime. However, it has been necessary to prepare the cyclohexanone oxime intermediate by means of one or more reactions. For example, the preparation of the oxime by treating nitrocyclohexane or its salts with hydroxylamine, hydrogen, ammonia, amines, sulfides, olefins, alkylene oxides, and the like is well known in the art. It is also known to prepare cyclohexanone oxime by treatment of cyclohexanone with hydroxylamine and by like processes. Although such multi-step processes for the preparation of lactams have generally produced satisfactory products, the need has long been recognized for a process whereby lactams could be prepared in a single reaction.

Accordingly, an object of the present invention is to provide a process for the direct preparation of lactams from readily available starting materials. Another object of the present invention is to provide a process whereby caprolactam can be prepared in a single reaction from water-soluble salts of nitrocyclohexane. A still further object of the present invention is to provide an efficient process for converting water-soluble salts of nitrocyclohexane to useful products. Other objects will become apparent as the invention is further described.

I have found that the foregoing objects can be achieved by adding an aqueous solution of an alkali metal salt of nitrocyclohexane, an alkali metal nitrite, and hydrazine or a hydrazine salt to concentrated mineral acid.

In accordance with the process of the present invention, an alkali metal salt, e. g., the potassium salt, of nitrocyclohexane, an alkali metal nitrite, e. g., sodium nitrite, and hydrazine or a hydrazine salt of a mineral acid, e. g., hydrazine sulfate, are added to a concentrated mineral acid, e. g., sulfuric acid or hydrochloric acid.

The following examples serve to illustrate specific embodiments of the method of carrying out the present invention. However, they will be understood to be illustrative only and not to limit the invention in any way. The parts in the following examples are parts by weight.

Example 1

Nitrocyclohexane in the amount of 23 parts was dissolved in 75 parts of water containing 10 parts of potassium hydroxide, and to the solution obtained was added 14 parts of sodium nitrite and 7 parts of 95% hydrazine. The mixture obtained was added to 120 parts of 95% sulfuric acid, the reaction mixture being maintained at a temperature of 40–50° C. during the addition. When the addition was complete, the temperature of the mixture was held between 35 and 50° C. for about one hour. The reaction mixture then was neutralized and extracted with chloroform. The extract was dried, the chloroform was removed by distillation, and the residue was distilled under vacuum to yield 8.9 parts (44% yield) of caprolactam.

Example 2

The procedure of Example 1 was employed in the following runs.

| Run | Reactants (parts) | | | | | | Reaction Temperature (°C.) | Yield of Caprolactam | |
|---|---|---|---|---|---|---|---|---|---|
| | NCH* | KOH | H₂O | 95% N₂H₄ | NaNO₂ | 95% H₂SO₄ | | Parts | Percent |
| A | 25 | 11 | 75 | 7 | 14 | 120 | 40–50 | 8.9 | 40 |
| B | 26 | 11 | 100 | 7 | 14 | 120 | 75–80 | 7.1 | 31 |
| C | 26 | 11 | 150 | 7 | 28 | 150 | 40–50 | 2.1 | 10 |

*NCH = nitrocyclohexane.

Example 3

Twenty-six parts of nitrocyclohexane was dissolved in 150 parts of water containing 13 parts of potassium hydroxide, and to the solution were added 20 parts sodium nitrite and 14 parts of 95% hydrazine. The mixture prepared then was added to 150 parts of concentrated hydrochloric acid, the reaction mixture being maintained at 50–60° C. during the addition. After completion of the addition, the reaction mixture was held at room temperature for a period of approximately one-half hour. The reaction mixture then was neutralized and worked up according to the procedure of Example 1. Caprolactam was obtained in the amount of 8.6 parts, a yield of 38%. In addition, 7.1 parts of cyclohexanone oxime (31% yield) was obtained. This represents a yield of useful products of 69%.

As the foregoing examples show, caprolactam is obtained in good yields in the process of the present invention by adding an aqueous solution of an alkali metal salt of nitrocyclohexane, an alkali metal nitrite, and hydrazine or a hydrazine salt of a mineral acid to concentrated sulfuric or hydrochloric acid. The examples likewise show that good yields are obtained in the present process when the alkali metal salt of nitrocyclohexane, the alkali metal nitrite, and the hydrazine or hydrazine salt are present in substantially stoichiometric amounts. However, the use of more than one stoichiometric equivalent of any reactant in the present process is not deleterious.

The preceding examples also show that the present process may be carried out within the temperature range between 40 and 80° C. Whereas the foregoing temperature range is to be preferred, temperatures between about 25 and 100° C. can be used successfully in the present process. Temperatures above 100° C. can also be employed in the process of the invention but generally are not considered desirable because the use of such temperatures requires the maintenance of the reaction system under superatmospheric pressure in order to keep the reactants in the liquid phase.

In the run of Example 3, cyclohexanone oxime was obtained in addition to the caprolactam produced. However, this conversion to oxime is not objectionable in the present process because the oxime represents a useful caprolactam intermediate which may be rearranged to caprolactam by any suitable method, e. g., by that method disclosed and claimed in U. S. Patent 2,487,246, issued November 8, 1949.

The process of the present invention has been illustrated by the preparation of caprolactam. However, the process can be applied equally well to the production of other lactams and substituted lactams, such as δ-valerolactam, γ-butyrolactam, ζ-enantholactam, η-caprylolactam, and substituted caprolactams and valerolactams, and the like. Correspondingly alkali metal salts of nitro cycloalkanes other than nitrocyclohexane can also be used as starting materials in the present process, e. g., nitrocyclopentane, nitrocyclobutane, nitrocycloheptane, nitrocyclooctane, substituted nitrocyclohexanes, and nitrocyclopentanes, and the like. Likewise, hydrazine salts of other mineral acids and other water-soluble nitrites can be employed in the present process.

The foregoing examples, particularly Example 1, illustrate a means of recovering the caprolactam produced in the process of the present invention. For example, after the addition of the alkali metal salt of nitrocyclohexane, the alkali metal nitrite, and the hydrazine or hydrazine mineral acid salt to the concentrated mineral acid, the reaction mixture can be neutralized by the addition of any suitable basic material and the desired lactam separated therefrom, e. g., by extraction.

The invention has been described in detail in the foregoing. It will be apparent to those skilled in the art that many variations can be introduced without departing from the spirit and scope of the invention. I intend, therefore, to be limited only by the following claims:

I claim:
1. A process for the production of caprolactam which comprises adding an aqueous solution of an alkali metal salt of nitrocyclohexane, an alkali metal nitrite, and a member of the group consisting of hydrazine and hydrazine salts of mineral acids to a concentrated mineral acid of the group consisting of sulfuric acid and hydrochloric acid.

2. Process according to claim 1, wherein the alkali metal salt of nitrocyclohexane is the potassium salt of nitrocyclohexane.

3. A process for the production of caprolactam which comprises adding an aqueous solution of an alkali metal salt of nitrocyclohexane, an alkali metal nitrite, and a member of the group consisting of hydrazine and hydrazine salts of mineral acids to a concentrated mineral acid of the group consisting of sulfuric acid and hydrochloric acid at a temperature between 25 and 100° C.

4. Process according to claim 3, wherein substantially stoichiometric equivalents of the alkali metal salt of nitrocyclohexane, the alkali metal nitrite, and the member of the group consisting of hydrazine and hydrazine salts of mineral acids are used.

5. A process for the production of caprolactam which comprises adding an aqueous solution of an alkali metal salt of nitrocyclohexane, an alkali metal nitrite, and a member of the group consisting of hydrazine and hydrazine salts of mineral acids to a concentrated mineral acid of the group consisting of sulfuric acid and hydrochloric acid at a temperature between 25 and 100° C., neutralizing the reaction mixture, and thereafter recovering caprolactam.

References Cited in the file of this patent

UNITED STATES PATENTS 2,313,026    Schlack _____ Mar. 2, 1943

OTHER REFERENCES

Nametkin et al.: Chem. Abst., vol. 44, col. 9362.